United States Patent [19]

Furuta et al.

[11] Patent Number: 5,075,376

[45] Date of Patent: Dec. 24, 1991

[54] THERMOPLASTIC RESIN COMPOSITION

[75] Inventors: Motonobu Furuta; Takashi Maruyama, both of Tsukuba; Satoru Hosoda, Ichihara, all of Japan

[73] Assignee: Sumitomo Chemical Company, Limited, Osaka, Japan

[21] Appl. No.: 461,396

[22] Filed: Jan. 5, 1990

[30] Foreign Application Priority Data

Jan. 12, 1989 [JP] Japan .................................. 1-003769

[51] Int. Cl.$^5$ ...................... C08L 51/06; C08L 53/00; C08L 71/12
[52] U.S. Cl. .......................................... 525/68; 525/92; 525/148; 525/152; 525/284; 525/285; 525/301; 525/316; 525/322; 525/323; 525/905
[58] Field of Search ................... 525/68, 92, 148, 152, 525/905

[56] References Cited

U.S. PATENT DOCUMENTS 4,128,602 12/1978 Katchman et al. .

FOREIGN PATENT DOCUMENTS 0329428 8/1989 European Pat. Off. ............... 525/68
49-75663 7/1974 Japan .
60-118739 6/1985 Japan .

Primary Examiner—Jacob Ziegler

Attorney, Agent, or Firm—Birch, Stewart, Kolasch & Birch

[57] ABSTRACT

Disclosed are thermoplastic resin compositions comprising:
(a) a polyphenylene ether resin or a resin composition containing a polyphenylene ether,
(b) (i) a modified propylene polymer obtainable by grafting a propylene polymer with a styrene-based monomer or a mixture of a styrene-based monomer and a monomer copolymerizable with the styrene-based monomer or (ii) a composition comtaining said modified propylene polymer and a propylene polymer, and
(c) a rubbery substance, wherein the number mean particle size of the component (a) and (c) in the dispersion phase being from 0.01 to 20 μm, the proportion of the component (a) to the sum of the components (a) and (b) being 1 to 80% by weight, that of the component (b) to the sum of the components (a) and (b) being 99 to 20% by weight, and the proportion of the component (c) to the sum of the components (a) and (b) being 1 to 50 parts by weight per 100 parts by weight of (a) plus (b). The thermoplastic resin composition has good moldability and yields molded articles having well-balanced physical properties.

11 Claims, No Drawings

THERMOPLASTIC RESIN COMPOSITION

BACKGROUND OF THE INVENTION a) Field of the Invention

The present invention relates to a novel thermoplastic resin composition which can be utilized as a material for producing molded articles by injection molding, extrusion molding or a like means.

b) Related Art

Generally, polyphenylene ethers are excellent in heat resistance, hot water resistance, dimension stability, and mechanical and electrical properties. On the other hand, they have disadvantages; for example, they show unsatisfactory moldability due to their high melt viscosity, poor chemical resistance, and low impact resistance.

Known methods for improving moldability by lowering the melt viscosity of polyphenylene ethers while maintaining their excellent properties include use of a mixture of a polyphenylene ether and a polystyrene resin. However, these known methods still fail to improve chemical resistance.

On the other hand, propylene polymers are not only excellent in various properties such as moldability, toughness, water resistance, chemical resistance, etc., but also they have low specific gravity and are cheap in cost; they have been widely used as a material for preparing various molded articles, films, sheets, etc.

However, the propylene polymers have defects or points which need to be improved in heat resistance, rigidity, impact resistance, coatability, adhesiveness, etc., which creates an obstacle in developing new practical utility. In particular, improvement in the heat resistance and impact resistance thereof is strongly desired.

Naturally, it may be expected to blend a polyphenylene ether and a propylene polymer to prepare a resin composition which could have the advantages of the both polymers and which could have improved moldability and impact resistance, and thus a wide possibility of new application would be available.

Blending a polyphenylene with a propylene polymer, however, actually gives rise to a resin composition in which miscibility of both polymers is poor so that molded articles obtained from such a blend as by injection molding, suffers phase separation between the polyphenylene ether and the propylene polymer, thereby providing articles having an extremely poor appearance and poor mechanical properties, which are unsatisfactory for practical purposes.

A method for improving the miscibility between a polyphenylene ether and a propylene polymer is known, as described in Published Japanese Patent Publication No. 22344/1981, in which method a polyphenylene ether is blended with a propylene polymer having bound thereon, a styrene based monomer by graft copolymerization. This method, however, fails to provide a composition having excellent impact resistance.

A resin composition having superior mechanical properties can be obtained by the incorporation of polyphenylene ether with a styrene monomer-grafted propylene polymer and a rubbery substance, as disclosed in Unexamined Japanese Patent Publication No. 207349/1989. However, conditions for dispersion phase of the components are not defined clearly.

Under these circumstances, there has been a strong demand for a composition composed of polyphenylene ether, modified propylene polymer, and rubbery substance, said composition having good mechanical properties and giving injection molded articles with a good appearance.

In view of the forgoing, the present inventors have studied intensively and extensively in order to develop effective technology, and as a result they have succeeded in the production of a new resin composition which is superior in heat resistance, melt-flow characteristic, processability, chemical resistance, appearance and gloss.

SUMMARY OF THE INVENTION

Therefore, the present invention provides a thermoplastic resin composition, comprising:

(a) a polyphenylene ether resin or a resin composition containing a polyphenylene ether, (b) (i) a modified propylene polymer obtainable by grafting a propylene polymer with a styrene-based monomer or a mixture of a styrene-based monomer and a monomer copolymerizable with the styrene-based monomer or (ii) a composition containing said modified propylene polymer and a propylene polymer, and (c) a rubbery substance, wherein the component (b) is in a state of matrix phase, and the component (a) and (c) each is in a state of dispersion phase.

Further, the present invention provides a thermoplastic resin composition, comprising:

(a) a polyphenylene ether resin or a resin composition containing a polyphenylene ether, (b) (i) a modified propylene polymer obtainable by grafting a propylene polymer with a styrene-based monomer or a mixture of a styrene-based monomer and a monomer copolymerizable with the styrene-based monomer or (ii) a composition containing said modified propylene polymer and a propylene polymer, and (c) a rubbery substance, wherein each number mean particle size of the components (a) and (c) in the dispersion phase being from 0.01 to 2 μm, the proprotion of the component (a) to the sum of the components (a) and (b) being 1 to 80% by weight, that of the component (b) to the sum of the components (a) and (b) being 99 to 20% by weight, and the proportion of the component (c) to the sum of the components (a) and (b) being 1 to 50 parts by weight per 100 parts by weight of (a) plus (b).

DETAILED DESCRIPTION OF THE INVENTION

The polyphenylene ether used in the present invention as the component (a) is a polymer obtainable by oxidative polymerization of at least one phenol compound represented by the general formula (1)

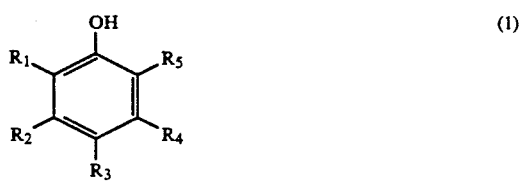

wherein $R_1$, $R_2$, $R_3$, $R_4$ and $R_5$, each independently represents a hydrogen atom, a halogen atom, a hydrocarbon group or a substituted hydrocarbon group, or a hydrocarbyloxy group or a substituted hydrocarbyloxy group, provided that one of $R_1$, $R_2$, $R_3$, $R_4$ and $R_5$ is a hydrogen atom, with oxygen or an oxygen-containing gas using an oxidative coupling catalyst.

Concrete examples of the groups represented by $R_1$, $R_2$, $R_3$, $R_4$ and $R_5$ include a hydrogen atoms, chlorine, bromine, fluorine, iodine, a methyl group, an ethyl group, an n- or iso-propyl group, a pri-, sec- or tert-butyl group, a chloroethyl group, a hydroxyethyl group, a phenylethyl group, a benzyl group, a hydroxymethyl group, a carboxyethyl group, a methoxycarbonylethyl group, a cyanoethyl group, a phenyl group, a chlorophenyl group, a methylphenyl group, a dimethylphenyl group, an ethylphenyl group, an allyl group, etc.

Concrete examples of the compounds represented by the general formula (1) include phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-tert-butylphenol, thymol, 2-methyl-6-allylphenol, etc.

In addition, there may be used phenol compounds which are outside the scope of the general formula (1), for example, those obtainable by copolymerizing a polyhydroxy aromatic compound such as bisphenol A, tetrabromobisphenol A, resorcinol, hydroquinone, novolak resin, etc., with one of the compounds represented by the general formula (1).

Of the above-described phenol compounds, preferred examples include homopolymers of 2,6-dimethylphenol (2,6-xylenol) or 2,6-diphenylphenol, or copolymers of a large amount of 2,6-xylenol and a small amount of 3-methyl-6-tert-butylphenol or 2,3,6-trimethylphenol.

The oxidative coupling catalyst which can be used in the oxidative polymerization of the phenol compounds is not limited particularly, but any catalyst can be used that can catalyze such a polymerization reaction.

Representative examples thereof include catalysts comprising a copper (I) salt and a tertiary amine such as copper (I) chloride-triethylamine and copper (I) chloride-pyridine, catalysts comprising a copper (II) salt, an amine and an alkali metal hydroxide such as copper (II) chloride-pyridine-potassium hydroxide, catalysts comprising a manganese salt and a primary amine, such as manganese chloride-ethanolamine and manganese acetate-ethylenediamine, catalysts comprising a manganese salt and an alcoholate or phenolate such as manganese chloride-sodium methylate and manganese chloride-sodium phenolate, catalysts comprising a cobalt salt and a tertiary amine, and the like.

It is known that the physical properties and the like of polyphenylene ethers vary depending on the reaction temperature of oxidative polymerization to obtain the polymer, i.e., high temperature polymerization, which is performed at temperatures higher than 40° C., and low temperature polymerization, which is carried out at temperatures not higher than 40° C., result in the production of polyphenylene ethers with different physical properties. In the present invention, both the high and low temperature polymerization reactions can be used.

The polyphenylene ethers which can be used in the present invention as the component (a) also includes, modified products obtained by grafting the above-mentioned polymer or copolymer with another polymer.

For example, the modified polymers include those obtained by oxidative polymerization of the phenol compound of the general formula (1)

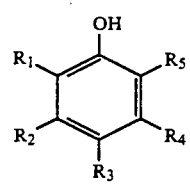

(1)

wherein $R_1$, $R_2$, $R_3$, $R_4$ and $R_5$ have the same meaning as defined above, in the presence of an ethylene-propylene-polyene terpolymer, those obtained by oxidative polymerization of the phenol compound of the general formula (1)

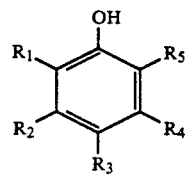

(1)

wherein $R_1$, $R_2$, $R_3$, $R_4$ and $R_5$ have the same meaning as defined above, in the presence of a polystyrene, those obtained by subjecting one or more styrene monomers and/or other monomers to organic peroxide graft polymerization in the presence of a polyphenylene ether as described in, for example, Unexamined Japanese Patent Publication Nos. 47862/1972, 12197/1973, 5623/1974, 38596/1977 and 30991/1977, and those obtained by melt-kneading the polyphenylene ether together with the polystyrene based polymer and a radical generating agent (e.g., peroxide) as described in, for example, Unexamined Japanese Patent Publication No. 142799/1977.

The resin composition containing the polyphenylene ether as the component (a) used in the present invention is a resin composition comprising a polyphenylene ether and an alkenyl aromatic resin and/or rubber-modified alkenyl aromatic resin.

The alkenyl aromatic resin is selected from resins which contain at least 25% by weight of a polymer unit derived from a monomer represented by the general formula (2)

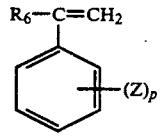

(2)

wherein $R_6$ represents a hydrogen atom, a lower alkyl group (e.g., alkyl group having 1-4 carbon atoms), or a halogen atom, Z represents a hydrogen atom, a vinyl group, a halogen atom, a hydroxy group, or a lower alkyl group, and p is 0 or an integer of 1 to 5.

Specific examples of the alkenyl aromatic resin include homopolymers such as polystyrene, polychlorostyrene and poly-α-methylstyrene, and copolymers thereof, and styrene-containing copolymers such as styrene-acrylonitrile copolymer, styrene-α-divinylbenzene copolymer, and styrene-acrylonitrile-α-methylstyrene copolymer. Of these, preferred are homopolystyrene, styrene-α-methylstyrene copolymer, styrene-acrylonitrile copolymer, styrene-α-chlorostyrene copolymer, and styrene-methyl methacrylate copolymer. Polystyrene is particularly preferred.

The rubber-modified alkenyl aromatic resin used in the present invention refers to a resin which forms a binary phase system composed of a matrix of an alkenyl aromatic resin and rubber particles dispersed therein. This resin can be prepared by mechanically mixing a rubbery substance (c) described hereinbelow and the alkenyl aromatic resin, or by dissolving the rubbery substance (c) in the alkenyl aromatic monomer and then polymerizing the alkenyl aromatic monomer. The latter method is employed on an industrial scale in the production of impact resistant polystyrenes. The rubber-modified alkenyl aromatic resin include also a mixture of one prepared by the latter method and a rubbery substance and/or an alkenyl aromatic resin.

The proportion at which polyphenylene ether and the alkenyl aromatic resin and/or rubber-modified alkenyl aromatic resin are mixed with each other can be varied widely, for example, in the range of 1 to 99% by weight of the polyphenylene ether and 99 to 1% by weight of the alkenyl aromatic resin and/or rubber-modified alkenyl aromatic resin. Within this range, optimal composition can be selected depending on the object and desired application.

The polyphenylene ether as the component (a) used in the present invention should preferably have a reduced viscosity ($\eta$sp/C) in the range of 0.27 to 0.53 dl/g, more preferably 0.30 to 0.48 dl/g, measured for a 0.5 g/dl chloroform solution at 25° C.

With a reduced viscosity lower than 0.27 dl/g, an object of the present invention is not attained since a resin composition is poor in mechanical strength, particularly impact resistance.

With a reduced viscosity higher than 0.53 dl/g, it is also not preferable, since the deflection temperature lowers extremely under load of a resin composition and the melt-flow characteristic of the resin composition become worse.

The component (b) used in the present invention is (i) a modified propylene polymer obtainable by grafting a propylene polymer with a styrene-based monomer or a mixture of a styrene-based monomer and a monomer copolymerizable with the styrene-based monomer or (ii) a composition containing said modified propylene polymer and a propylene polymer.

By the term "modified propylene polymer" is meant a copolymer comprising 100 parts by weight of propylene polymer and 0.2 to 200 parts by weight, preferably 2 to 150 parts by weight of a styrene-based monomer or a mixture of a styrene-based monomer and a monomer copolymerizable with the styrene-based monomer which is obtained by graft copolymerization.

When the amount of the monomer to be graft-polymerized is smaller than 0.2 part by weight, the effect of modification of resins is not observed. On the other hand, the chemical resistance of the resin is deteriorated when the amount of the monomer to be graft-polymerized is larger than 200 parts by weight.

The propylene polymer (inclusive of the raw polymer to be modified) used in the component (b) of the present invention is a propylene homopolymer or a propylene copolymer. By the term "propylene copolymer" is meant a random or block copolymer of propylene and an $\alpha$-olefin having 2 to 18 carbon atoms.

Specific examples of the propylene copolymer include ethylene-propylene copolymer, propylene-butene-1 copolymer, propylene-hexene-1 copolymer, propylene-4-methylpentene-1 copolymer, and propylene-octene-1 copolymer.

As for the propylene polymer, it may be used a highly crystalline propylene polymer if necessary.

The "highly crystalline propylene polymer" used in the present invention means as crystalline propylene polymer of which the propylene homopolymer portion or that portion in the first segment polymerized in the first step of the homopolymer or block copolymer production contains a boiling-heptane-insoluble moiety having an isotactic pentad fraction of at least 0.970, or a crystalline propylene polymer of which the propylene homopolymer portion contains a boiling-heptane-insoluble moiety having an isotactic pentad fraction of at least 0.970, a boiling-heptane-soluble moiety in an amount of not larger than 5.0% by weight and a 20° C. xylene-soluble moiety in an amount of not larger than 2.0% by weight.

The isotactic pentad fraction of the boiling-heptane-insoluble moiety, the content of the boiling-heptane-soluble moiety and the content of the 20° C. xylene-soluble polymer can be determined as described below.

That is, after completely dissolving 5 g of the propylene polymer in 500 ml of boiling xylene, the temperature of the resulting solution is decreased to 20° C. and is left at this temperature for 4 hours, followed by filtration to separate a 20° C. xylene-insoluble moiety. The filtrate is concentrated to dryness to evaporate xylene and dried at 60° C. under reduced pressure to obtain a 20° C. xylene-soluble moiety. A value obtained by dividing this dry weight by the weight of the charge sample and expressed as percentage is defined as the content of the 20° C. xylene-soluble moiety. After drying, the 20° C. xylene-insoluble moiety is extracted with boiling n-heptane for 8 hours using Soxhlet apparatus. The residue obtained is called a boiling-heptane-insoluble moiety, and a value obtained by subtracting the dry weight of the moiety from the weight (5 g) of the charge sample and dividing the resulting amount by the weight of the charge sample, expressed in percentage, is defined as the content of the boiling-heptane-soluble moiety.

The "isotactic pentad fraction" means the amount of isotactic linkage expressed in pentad unit in the molecular chain of the propylene polymer, i.e., a fraction of a propylene monomer unit present in the center of a linkage composed of 5 propylene monomer units continuously bonded to each other with meso-bonding, which can be measured by using $^{13}$C-NMR as described in Macromolecules, 6, 925 (1973) by A. Zambelli et al. The assignment of NMR peaks, however, is determined based on the teaching of Macromolecules, 8, 687 (1975).

More particularly, the isotactic pentad fraction is measured as the area fraction of mmmm peak in total absorption peak in the region of methyl carbon in $^{13}$C-NMR spectrum. The isotactic pentad fraction measured by this method of CRM No. M19-14 Polypropylene PP/MWD/2, an NPL standard substance of National Physical Laboratory, United Kingdom, was 0.944.

Such highly crystalline polypropylene as described above can be prepared by methods disclosed in, for example, Unexamined Japanese Patent Publication Nos. 28405/1985, 228504/1985, 218606/1986 and 287917/1986.

In the field where high rigidity is required, it is preferred to blend a nuclei generating agent to the propylene polymer. It is known that aluminium or sodium salts of aromatic carboxylic acids (cf. Unexamined Japanese Patent Publication No. 80829/1983), aromatic carboxylic acids, metal salts of aromatic phosphoric acids and sorbitol derivatives (cf. Published Japanese Patent Publication No. 12460/1980 and Unexamined Japanese Patent Publication No. 129036/1983), for example, when added, serve as a nuclei generating agent (hereinafter, referred to as "nucleating agent") for crystals to give rise to high crystallinity.

It is also known that in addition to these nucleating agents, vinylcycloalkane polymers having not smaller than 6 carbon atoms can serves as a nucleating agent effectively as described in Unexamined Japanese Patent Publication No. 1738/1987.

It is also described in Unexamined Japanese Patent Publication No. 234462/1989 that a polyphenylene ether composition blended with a crystalline polypropylene polymer containing a vinylcycloalkane polymer shows excellent mechanical characteristics.

More particularly, a highly crystalline polypropylene composition obtained by blending the vinylcycloalkane polymer having not smaller than 6 carbon atoms with the highly crystalline propylene polymer such that the composition contains 0.05 to 10,000 ppm by weight of the vinylcycloalkane unit has higher crystallinity.

It is also obtained a propylene polymer with high stiffness by blending the above-mentioned high crystalline propylene polymer with the vinylcycloalkane polymer.

By the term "vinylcycloalkane polymer" is meant a homopolymer of vinylcycloalkane, a random copolymer of the vinylcycloalkane and a small amount of another vinylcycloalkane or an α-olefin, or a block copolymer of the vinylcycloalkane and an α-olefin.

The vinylcycloalkane block copolymer includes multistep copolymers of various α-olefins with vinylcycloalkanes such as (1) a copolymer obtained by polymerizing a vinylcycloalkane in a first step, and then performing the homopolymerization of propylene in a second step, (2) a copolymer obtained by polymerizing a vinylcycloalkane in a first step, and then effecting the random copolymerization of propylene with one or more α-olefins in a second step, and (3) a copolymer prepared by homopolymerizing propylene in first step, polymerizing a vinylcycloalkane in a second step, and then effecting the homopolymerization of propylene or the random copolymerization of propylene with one or more other α-olefins in a third step.

Of these vinylcycloalkane polymers, preferred polymers are the block copolymers, and more preferably the block copolymers with propylene as indicated in (1) to (3) above.

Specific examples of the vinylcycloalkane having not smaller than 6 carbon atoms which can be used in the present invention include vinylcyclobutane, vinylcyclopentane, vinyl-3-methylcyclopentane, vinylcyclohexane, vinyl-2-methylcyclohexane, vinyl-3-methylcyclohexane, and vinylnorbornane. Of these, preferred are vinylcycloalkanes having not smaller than 8 carbon atoms.

The amount of the vinylcycloalkane unit to be blended with the propylene polymer is such that improving the can be achieved without changing the inherent physical properties of the propylene polymer, and more specifically, 0.05 to 10,000 ppm by weight, preferably 0.5 to 5,000 ppm by weight, and more preferably 0.5 to 1,000 ppm by weight.

The propylene polymer and the vinylcycloalkane polymer used in the present invention can be advantageously prepared with a catalyst system comprising a titanium compound and an organoaluminium compound.

As for the titanium compound, there can be used titanium trichloride catalysts commercially available from Toyo Stoffer Co., Toho Titanium Co., Marubeni Solvay Co., etc. Also, there can be used catalysts which comprise a magnesium compound as a carrier and a titanium compound as described in Unexamined Japanese Patent Publication Nos. 59916/1982 and 133408/1980.

As for the organoaluminium compound, preferred is an alkylaluminium compound represented by formula (3)

$$Al(X)_a(R)_{(3-a)} \qquad (3)$$

wherein X represents a halogen atom, an alkoxy group, or a hydrogen atom, R represent an alkyl group having 1 to 18 carbon atoms, a is number of $0 \leq a < 3$. Specific examples of the organoaluminium include $Al(CH_3)_3$, $Al(C_2H_5)_3$, $Al(C_2H_5)_2Cl$, $Al(C_2H_5)_2Br$, $Al(C_2H_5)_2(OC_2H_5)$, $Al(C_2H_5)_2(OC_4H_9)$, $Al(C_2H_5)(OC_4H_9)$, $Al(C_2H_5)Cl_2$, $Al(C_4H_9)_3$, $Al(C_4H_9)_2Cl$, $Al(C_6H_{13})_3$, $Al(C_6H_{13})_2Cl$, etc. and mixtures thereof. In order to improve stereoregularity, it is possible to produce the propylene polymer and the vinylcycloalkane polymer with the addition of an electron donor such as an ester of carboxylic acid, phosphoric acid or silicic acid.

The highly crystalline propylene polymer and the vinylcycloalkane polymer can be blended by a conventional method which is applied to the blending of ordinary α-olefin polymers. That is, powders of both polymers, granulated pellets of both polymers, or powder of one polymer and granulated pellets of the other polymer are mixed with each other with a Henschel mixer or a like mixer, and melt-kneaded with a Brabender mixer, a roll mixer, a Banbury mixer or a granulator.

The component (b) used in the resin composition in the present invention is a propylene polymer alone (that is, the propylene homopolymer or the propylene copolymer), or a mixture of one or more of them.

The styrene-based monomer in the component (b) which can be used in the modification of the propylene polymers is represented by the general formula (4)

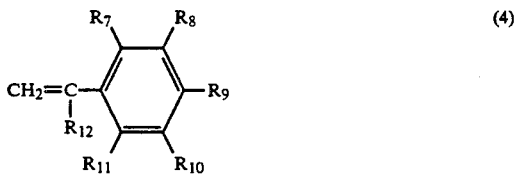

(4)

wherein $R_7$, $R_8$, $R_9$, $R_{10}$ and $R_{11}$, each represents a hydrogen atom, a halogen atom, an unsubstituted or substituted hydrocarbyl group, or an unsubstituted or substituted hydrocarbyloxy group, and $R_{12}$ represents a hydrogen atom, or a lower alkyl group having 1 to 4 carbon atoms.

Specific examples of $R_7$, $R_8$, $R_9$, $R_{10}$ and $R_{11}$ in the general formula (4) include a hydrogen atom, a halogen atom such as chlorine, bromine and iodine, a hydrocarbyl group such as a methyl group, an ethyl group, a propyl group, a vinyl group, an allyl group, a benzyl group and a methylbenzyl group, a substituted hydrocarbyl group such as a chloromethyl group and a bromomethyl group, a hydrocarbyloxy group such as a methoxy group, an ethoxy group and a phenoxy group, and a substituted hydrocarbyloxy group such as a monochloromethoxy group.

Specific examples of $R_{12}$ include a hydrogen atom and a lower alkyl group such as a methyl group and an ethyl group.

Specific examples of the styrene monomer include styrene, 2,4-dichlorostyrene, p-methoxystyrene, p-methylstyrene, p-phenylstyrene, p-divinylbenzene, p-chloromethoxystyrene, α-methylstyrene, o-methyl-α-methylstyrene, m-methyl-α-methylstyrene, p-methyl-α-methylstyrene and p-methoxy-α-methylstyrene. They may be used alone or in admixture. Of these, styrene is preferred.

The above-mentioned styrene-based monomer is not the only grafting monomer to prepare the modified propylene polymer in component (b). It is also possible to use a mixture of the styrene-based monomer and a monomer copolymerizable therewith.

Such a mixture provides the propylene polymer which is responsible for the thermoplastic resin having improved mechanical properties.

Specific examples of the monomer copolymerizable with the styrene-based monomer include acrylonitrile, methacrylonitrile, fumaric acid, maleic acid, vinyl ketone, maleic anhydride, acrylic acid, methacrylic acid, vinylidene chloride, maleate ester, methyl methacrylate, ethyl methacrylate, propyl methacrylate, butyl methacrylate, methyl acrylate, ethyl acrylate, propyl acrylate, butyl acrylate, vinyl chloride, vinyl acetate, divinyl benzene, ethylene oxide, glycidyl acrylate, glycidyl methacrylate, vinylidene chloride, isobutene, alkyl vinyl ether, anethole, indene, coumarone, benzofuran, 1,2-dihydronaphthalene, acenaphthylene, isoprene, chloroprene, trioxane, 1,3-dioxolane, propylene oxide, β-propiolactone, vinyl biphenyl, 1,1-diphenylethylene, 1-vinylnaphthalene, 2-vinylnaphthalene, 2-vinylpyridine, 4-vinylpyridine, 2,3-dimethylbutadiene, ethylene, propylene, allyltrimethylsilane, 3-butenyltrimethylsilane, vinyl carbazole, N,N-diphenylacrylamide, and fumarnitrile. Derivatives of these monomers can also be used. They may be used alone or in combination with one another. Preferable among these are maleic anhydride, acrylonitrile, glycidyl methacrylate, and glycidyl acrylate.

The amount of the styrene-based monomer in the mixture of the styrene-based monomer and the monomer copolymerizable with the styrene-based monomer may vary in the range of 1 to 100 wt %, depending on the intended use of the resin composition.

The styrene-based monomer and the monomer copolymerizable with the styrene-based monomer may be grafted to a propylene polymer by any known method. In other words, grafting can be accomplished by mixing a propylene polymer with a grafting monomer and a peroxide and melt-mixing the mixture in a melt-mixing apparatus; by dispersing a propylene polymer together with a grafting monomer into water, adding a peroxide to the dispersion, stirring the dispersion with heating under a nitrogen atmosphere, cooling the reaction system, and filtering out the reaction product, followed by washing and drying; or by exposing a propylene polymer to UV light, radiation, oxygen, or ozone in the presence of a grafting monomer.

Alternatively, grafting may also be accomplished in two stages. First, the styrene-based monomer and the monomer copolymerizable with the styrene-based monomer are polymerized or copolymerized individually by any known method. Secondly, the resulting polymer or copolymer is grafted to a propylene polymer.

For example, the grafting of a propylene polymer with a styrene-based monomer and an acrylate ester may be accomplished as follows. First, a copolymer is prepared from the styrene-based monomer and acrylate ester by anionic polymerization. Secondly, the copolymer is melt-mixed with a propylene polymer and a peroxide to give a modified propylene polymer. Alternatively, a propylene polymer may be copolymerized with a styrene monomer and glycidyl methacrylate by radical polymerization.

The peroxide used to prepare the modified propylene polymer is not specifically limited; it may be selected from the following organic peroxides.

2,2'-azobisisobutyronitrile,
2,2'-azobis(2,4,4-trimethylvaleronitrile),
methyl ethyl ketone peroxide,
cyclohexanone peroxide,
3,3,5-trimethylcyclohexanone peroxide,
2,2-bis(t-butylperoxy)butane,
t-butyl hydroperoxide,
cumene hydroperoxide,
diisopropylbenzene hydroperoxide,
2,5-dimethylhexane-2,5-dihydroperoxide,
di-t-butyl peroxide,
1,3-bis(t-butylperoxyisopropyl)benzene,
2,5-dimethyl-2,5-di(t-butylperoxy)hexane,
2,5-dimethyl-2,5-di(t-butylperoxy)hexyne-3,
lauroyl peroxide,
3,3,5-trimethylhexanoyl peroxide,
benzoyl peroxide,
t-butyl peracetate,
t-butylperoxy isobutyrate,
t-butyloxy privalate,
t-butyloxy-2-ethylhexanoate,
t-butylperoxy-3,5,5-trimethylhexanoate,
t-butyl peroxylaurate,
t-butyl peroxybenzoate,
di-t-butyl peroxyisophthalate,
2,5-dimethyl-2,5-di(benzoylperoxy)hexane,
t-butyl peroxymaleic acid,
t-butyl peroxyisopropyl carbonate, and
polystyrene peroxide.

Component (b) in the resin composition of the present invention is a propylene polymer modified with the above-mentioned styrene monomer or a mixture of the styrene monomer and a monomer copolymerizable with the styrene monomer. If necessary, this modified propylene polymer may be used in combination with an linear low density polyethylene modified with a styrene monomer and/or an unmodified propylene polymer or linear low density polyethylene.

Examples of the unmodified propylene polymer include propylene homopolymer and propylene copolymers such as ethylene-propylene copolymer, propylene-1-hexene copolymer, propylene-4-methyl-1-pentene copolymer, and propylene-1-octene copolymer, which have been given earlier to explain the modification with a styrene monomer.

As the α-olefin monomer constituting the linear low density polyethylene may be cited α-oleins (excluding propylene) corresponding to the above-mentioned propylene copolymer.

The modified propylene polymer or linear low density polyethylene to be used for component (b) should preferably be one which is derived from an unmodified polymer having a density of 0.82–0.92 g/cm$^3$.

The preferred amount is 1-40 parts by weight for 100 parts by weight of the modified propylene polymer and/or propylene polymer in component (b).

The incorporation of these components improves the impact resistance of the resin composition.

Component (b) in the thermoplastic resin composition of the present invention may be incorporated with a variety of additives, according to need, during the compounding process or during the fabricating process. Examples of the additives include antioxidant, heat stabilizer, light stabilizer, antistatic agent, inorganic and organic colorant, corrosion inhibitor, crosslinking agent, blowing agent, slip agent, plasticizer, fluorescent agent, surface smoothing agent, and surface brightener.

The thermoplastic resin composition of the present invention contains component (c), which is a rubbery substance, in addition to the above-mentioned components(a) and (b).

The "rubbery substance" denotes any natural and synthetic polymeric material which is elastic at room temperature. It includes, for example, natural ruber, butadiene polymer, butadiene-styrene copolymer (including random copolymer, block copolymer, and graft copolymer) and hydrogenated products thereof, isoprene polymer, chlorobutadiene polymer, butadiene-acrylonitrile copolymer, isobutylene polymer, isobutylene-butadiene copolymer, isobutylene-isoprene copolymer, acrylic ester copolymer, ethylene-propylene copolymer, ethylene-butene copolymer, ethylene-propylene-styrene copolymer, styrene-isoprene copolymer and hydrogenated products thereof, styrene-butylene copolymer, styrene-ethylene-propylene copolymer, perfluororubber, fluororubber, chloroprene rubber, butyl rubber, silicone rubber, ethylene-propylene-non-conjugated diene copolymer, thiokol rubber, polysulfide rubber, polyurethane rubber, polyether rubber (such as polypropylene oxide), epichlorohydrin rubber, polyester elastomer, polyamide elastomer, and epoxy group-containing copolymer.

The epoxy group-containing polymer denotes a copolymer composed of an unsaturated epoxy compound and an ethylenically unsaturated compound.

The epoxy group-containing polymer is not specifically limited in its composition; but it should preferably contain an unsaturated epoxy compound in an amount of 0.1-50 wt %, more desirably 1-30 wt %.

The unsaturated epoxy compound is a compound which has in the molecule an epoxy group and an unsaturated group copolymerizable with an ethylenically unsaturated compound.

Examples of the unsaturated epoxy compound are unsaturated glycidyl esters and unsaturated glycidyl ethers represented by the general formulas [III] and [IV] below, respectively.

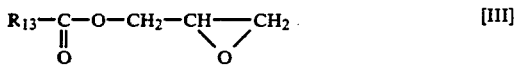

wherein $R_{13}$ represents a $C_{2-18}$ hydrocarbon group having an ethylenically unsaturated bond.

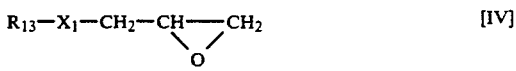

wherein $R_{13}$ represents a $C_{2-18}$ hydrocarbon group having an ethylenically unsaturated bond, and $X_1$ is a group represented by

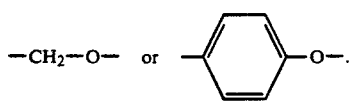

Examples of the compound represented by the formulas above include glycidyl acrylate, glycidyl methacrylate, glycidyl itaconate ester, allylglycidyl ether, 2-methylallylglycidyl ether, and styrene-p-glycidyl ether.

Examples of the ethylenically unsaturated compound include olefins, vinyl esters of saturated carboxylic acids having 2-6 carbon atoms, esters of acrylic acid or methacrylic acid with saturated alcohols having 1-8 carbon atoms, maleic ester, methacrylic ester, fumaric esters, halogenated vinyls, styrenes, nitriles, vinylethers, and acrylamides.

Specific examples include ethylene, propylene, butene-1, vinyl acetate, methyl acrylate, ethyl acrylate, methyl methacrylate, ethyl acrylate, methyl methacrylate, dimethyl maleate, diethyl fumarate, vinyl chloride, vinylidene chloride, styrene, acrylonitrile, isobutyl vinyl ether, and acrylamide. Preferable among them is ethylene.

When the epoxy group-containing copolymer as the rubbery substance is copolymerized with ethylene and vinyl acetate and/or methyl acrylate, it has a lower glass transition point. This improves further the impact resistance of the thermoplastic resin composition at low temperatures.

The rubbery substance may be produced by any process (e.g., emulsion polymerization and solution polymerization) using any catalyst (e.g., peroxide, trialkyl aluminum, lithium halide, and nickel-based catalyst).

Moreover, the rubbery substance may have a varied degree of crosslinking, a varied ratio of microstructure (e.g., cis-structure, trans-structure, and vinyl group), and a varied average rubber particle diameter.

In addition, the above-mentioned copolymer as the rubbery substance may be in the form of random copolymer, block copolymer, or graft copolymer. These copolymers may also be used in a modified form. Examples of the modifier include styrene, maleic anhydride, glycidyl methacrylate, glycidyl acrylate, and carboxylic acid-containing compounds. They may be used alone or in combination with one another.

The above-mentioned rubbery substances (including modified products thereof) may be used alone or in combination with one another.

Examples of the ethylene-α-olefin copolymer rubbers include copolymers of ethylene with another α-olefin (such as propylene, 1-butene, 1-pentene, 1-hexene, 4-methyl-1-pentene, and 1-octene) and terpolymers (such as ethylenepropylene-1-butene copolymer). Preferable among these are ethylene-propylene copolymer rubber.

The ethylene-α-olefin copolymer rubber should contain ethylene in an amount of 15-85 wt %, preferably 40-80 wt %. With an ethylene content in excess of 85 wt %, the copolymer rubber has such a high crystalline structure that it is difficult to process under the ordinary rubber molding conditions. With an ethylene content less than 15 wt %, the copolymer rubber has a high glass transition point (Tg), losing some of its rubber properties. A preferred glass transition point is −10° C. or below.

An ethylene-α-olefin-nonconjugated diene copolymer rubber is also preferable. In this case, the content of the nonconjugated diene should be less than 20 wt %. Otherwise, the copolymer rubber will be poor in fluidity due to gelation that takes place at the time of kneading. Preferred examples of the nonconjugated diene include ethylidene norbornene, dicyclopentadiene, and 1,4-hexa-diene.

The copolymer rubber should have a number-average molecular weight in the range of 10,000 to 100,000 so that it can be kneaded in an extruder. With an excessively small molecular weight, the copolymer rubber is hard to handle for the feeding to an extruder. With an excessively high molecular weight, the copolymer rubber has such a low fluidity that it is difficult to process. The copolymer rubber should preferably have a Mooney viscosity ($ML_{1+4}$, 121° C.) of 5 to 120.

The copolymer rubber is not specifically limited in molecular weight distribution. However, it should preferably have a molecular weight distribution expressed in terms of Q value (the weight-average molecular weight divided by the number-average molecular weight) in the range of 1 to 30, desirably 2 to 20.

The rubbery substance as component (c) may also be a modified product of ethylene-α-olefin copolymer rubber. It includes an unsaturated dicarboxylic acid-modified ethylene-α-olefin copolymer rubber which is prepared by grafting the above-mentioned ethylene-α-olefin copolymer rubber with an unsaturated dicarboxylic acid. Examples of the unsaturated dicarboxylic acid include maleic anhydride, maleic acid, fumaric anhydride, and citraconic anhydride.

The unsaturated dicarboxylic acid or its anhydride-modified ethylene-α-olefin copolymer rubber can be prepared by known methods. To take an example of using maleic anhydride as a modifying agent, the preparation method is explained below. That is, maleic anhydride and a free radical initiator together with an ethylene-α-olefin copolymer rubber are added to a hydrocarbon solvent and allowed to react at 60° to 150° C. for several minutes to several hours to obtain a solution containing a modified rubber. In this case, alcohols, amines, etc., may be added to convert maleic anhydride to its half ester or half amide, if desired. The solution thus obtained may be poured into a large amount of methanol, acetone, etc., to recover the modified rubber.

Alternatively, the modified copolymer rubber can be prepared by kneading maleic anhydride and a free radical initiator together with an ethylene-α-olefin copolymer rubber in an extruder. For example, 0.5 to 15 parts by weight of maleic anhydride per 100 parts by weight of the rubber and 0.005 to 1.0 part by weight of the free radical initiator per 100 parts by weight of the rubber are kneaded together with the rubber at 150° to 300° C. for several minutes to several tens minutes to obtain a modified copolymer rubber. If necessary or desired, gelation preventives, for example, phenol based antioxidants such as 2,6-di-t-butyl-hydroxytoluene (BHT) may be used in combination.

In the present invention, various other types of modified ethylene-α-olefin copolymer rubbers may be used as the rubbery substance, for example, modified ethylene-α-olefin copolymer rubber which are modified with monomer compounds selected from methyl acrylate, methyl methacrylate, allyl glycidyl ether, glycidyl methacrylate, glycidyl acrylate, etc., in addition to maleic anhydride referred to above. Furthermore, rubbery substances obtained by modifying the ethylene-α-olefin copolymer rubber with two or more of the monomer compounds may be used. Also, two or more members selected from the ethylene-α-olefin copolymer rubber and the modified ethylene-α-olefin copolymer rubber may be used simultaneously.

The above-described styrene monomer-grafted ethylene-α-olefin copolymer rubber can also be prepared by a method comprising dispersing in pure water minute chips or pellets of an ethylene-α-olefin copolymer rubber together with a dispersing agent, impregnating the copolymer rubber with a styrene monomer, and reacting them at 50° to 150° C. for 1 to 5 hours using a free radical initiator.

As for the rubbery substance used as component (c), preferred are ethylene-propylene copolymer rubber or its styrene-modified products, ethylene-propylene-nonconjugated diene copolymer rubber or its styrene-modified products, butadiene-styrene copolymer or its hydrogenated products, or epoxy group-containing copolymer.

In the resin composition of the present invention, components (b) is in a state of matrix phase and component (a) and (c) each is in a state of dispersion phase. Two or all of components (a), (b) and (c) can be partially in a state of mutual penetration.

A number mean particle size of components (a) and (c) dispersed in the matrix phase of component (b) should be $0.01\mu$ to $2\mu$.

If the number mean particle size is less or more than specified above, the resin composition is poor in heat resistance, impact resistance and chemical resistance.

In the case in which a block polypropylene is used as a propylene polymer of component (b), the number mean particle size of ethylene-propylene copolymer rubber in the propylene polymer should be also preferably $0.01\mu$ to $2\mu$.

According to the present invention, the thermoplastic resin composition exhibits its desired properties when two conditions are satisfied, that is, it contains components (a), (b) and (c) in ratios within the specific range, and the components each exists in the state as above-mentioned.

The ratio of component (a) to component (b) may be 1–80 wt % to 99–20 wt %, and the component (c) should preferably be used in an amount of 1 to 50 parts by weight per 100 parts by weight of the sum of the components (a) and (b).

With component (a) less then one wt %, the resin composition is poor in heat resistance; with component (a) more than 80 wt %., the resin composition is poor in processability and chemical resistance.

When the component (c) is contained in an amount of less than 1 part by weight, the improvement of impact resistance by the addition of component (c) is poor. On the other hand, with the component (c) in an amount of exceeding 50 parts by weight, the excellent properties which polyphenylene ether has inherently are weakened, which is not desirable.

In the thermoplastic resin composition of the present invention, other high molecular weight compounds may be added. Examples of the other high molecular weight compounds include polyolefins (exclusive of polypropylene and modified polypropylene) such as polymethylpentene; homopolymers and copolymers of various vinyl compounds such as polyvinyl chloride, polystyrene, polymethyl methacrylate, polyvinyl acetate, polyvinylpyridine, polyvinylcarbazole, polyacrylamide, polyacrylonitrile, ethylene-vinyl acetate copolymer, and alkenyl aromatic resins; polycarbonate, polysulfone, polyethylene terephthalate, polybutylene terephthalate, polyarylene esters (e.g, U polymer produced by Unitika Co.), polyphenylene sulfide; polyamides such as Nylon-6, Nylon-6,6, Nylon-12, etc.; condensed high molecular weight compounds such as polyacetals, etc. Furthermore, various thermosetting resins can be used, examples of which include silicone resins, fluorinated resins, polyimides, polyamideimides, phenol resins, alkyd resins, unsaturated polyester resins, epoxy resins, diallylphthalate resins, etc.

Moreover, coumarone-indene resins, petroleum resins, rosin resins, terpene resins, alicyclic saturated hydrocarbon resins, aromatic hydrocarbon resins, etc., may be added to the thermoplastic resin composition.

In practicing the present invention, the thermoplastic resin composition may be kneaded together with a reinforcing agent, such as glass fiber or carbon fiber, an inorganic or organic filler, such as carbon black, silica or $TiO_2$, a plasticizer, a stabilizer, a flame retardant, a dye, a pigment, etc.

More particularly, the reinforcing agent is to increase mechanical and thermal properties such as bending strength, flexural modulus, tensile strength, modulus in tension, and heat distortion temperature when it is admixed. Examples thereof include alumina fiber, carbon fiber, glass fiber, high modulus polyamide fiber, high modulus polyester fiber, silicon carbide fiber, titanate whisker, etc.

As for the amount of the reinforcing agent, it is sufficient that the reinforcing agent is contained in amounts effective for reinforcing the thermoplastic resin composition and usually it is preferred to use about 5 to 100 parts by weight of the reinforcing agent per 100 parts by weight of the resin composition of the present invention.

Particularly preferred reinforcing filler is glass, and it is preferred to use glass fiber filament composed of borosilicate glass containing a relatively small amount of sodium, which is made of gypsum and aluminium borosilicate. This glass is known as "Σ" glass. However, in the case where electric properties are not so important, other glass such as one known as "C" glass, which contains sodium in small amounts, is also useful. The glass fiber filament can be produced by conventional methods, for example, steam or air blowing, flame blowing, and mechanical drawing. Filaments suitable for reinforcing plastics can be produced by mechanical drawing. The diameter of the filament ranges from about 2 to 20 μm, which is not so strict in the present invention.

In the present invention, the length and form of the glass fiber filament are not limited particularly. The filaments may be stranded into multifilament fibers, which may then be stranded into threads, ropes or rovings. The filaments may also be woven to obtain mats. However, it is convenient to use glass filaments cut in the form of strands about 0.3 to about 3 cm, preferably about 0.6 cm or less, in length.

To be in detail on the flame retardant, flame retardants useful in the present invention include a group of compounds well known to one skilled in the art.

Generally, more important compounds in the known compounds are compounds containing elements capable of imparting flame retardance such as bromine, chlorine, antimony, phosphor and nitrogen. For example, there can be used halogenated organic compounds, antimony oxide, a mixture of antimony oxide and a halogenated organic compound, a mixture of antimony oxide and a phosphor compound, a phosphor element, a phosphor compound, a mixture of a phosphor compound or a compound containing a phosphor-nitrogen bond and a halogen-containing compound, and mixtures of two or more of these.

The amount of the flame retardant is not limited particularly and it is sufficient to use it in amounts effective for imparting flame retardancy. It is disadvantageous to use too much of the flame retardant since the physical properties of the resulting composition is deteriorated, i.e., the softening point of the resin composition, for example, decreases. An appropriate amount of the flame retardant is 0.5 to 50 parts by weight, preferably 1 to 25 parts by weight, and more preferably 3 to 15 parts by weight, per 100 parts by weight of the polyphenylene ether (a) or a resin composition containing the polyphenylene ether (a).

Useful halogen-containing compounds include those represented by the general formula (6)

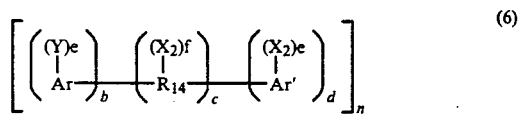

wherein n is an integer of 1 to 10, $R_{14}$ represents a member selected from the class consisting of an alkylene group, an alkylidene group or an alicyclic group (e.g., a methylene group, an ethylene group, a propylene group, an isopropylene group, an isopropylidene group, a butylene group, an isobutylene group, an amylene group, a cyclohexylene group, a cyclopentylidene group, etc.), an ether group, a carbonyl group, an amine group, a sulfur-containing group (e.g, sulfide group, sulfoxide group, sulfone group, etc.), a carbonate group, and a phosphor-containing group.

$R_{14}$ may be a group which is composed of two or more alkylene or alkylidene groups bonded to each other with a group such as an aromatic group, an amino group, an ether group, an ester group, a carbonyl group, a sulfide group, a sulfoxide group, a sulfone group, or a phosphor-containing group. Ar and Ar' each are a monocyclic or polycyclic carbocyclic aromatic residue such as a phenylene group, a biphenylene group, a terphenylene group, or naphthylene.

Ar and Ar' may be the same or different.

Y represents a substituent group selected from the class consisting of an organic group, an inorganic group or an organometallic group. The substituent groups represented by Y may be (1) e.g., halogen atoms such as chlorine, bromine, iodine or fluorine, (2) an ether group represented by the general formula —OE wherein E is a monovalent hydrocarbyl group which is the same as those represented by $X_2$ below, (3) —OH group, (4) a monovalent hydrocarbyl group, or (5) other substituent groups such as a nitro group, or a cyano group. When e is 2 or more, Y's may be the same or different.

$X_2$ is a monovalent hydrocarbyl group such as an alkyl group, e.g., a methyl group, an ethyl group, a propyl group, an isopropyl group, a butyl group, a decyl group, etc., an aryl group, e.g., a phenyl group, a naphthyl group, a biphenyl group, a xylyl group, a tolyl group, etc., an aralkyl group, e.g., a benzyl group, an ethylphenyl group, etc., an alicyclic group, e.g., a cyclopentyl group, a cyclohexyl group, etc., or a monovalent hydrocarbyl group containing an inert substituent group therein. When two or more $X_2$'s are used they may be the same or different.

e is an integer of from 1 to maximum number of hydrogen atoms on the aromatic ring Ar or Ar' which hydrogen atoms can be substituted.

f is 0 or an integer of 1 to a maximum number of hydrogen atoms on $R_{14}$ which hydrogen atoms can be substituted.

b, c and d are integers inclusive of 0. When c is not 0, neither b nor d is 0. Alternatively, only one of b and d may be 0. When c is 0, the aromatic groups are bonded to each other directly through a carbon-carbon bond.

The hydroxy group or the substituent groups represented by Y one the aromatic residue Ar and Ar' may be present at any desired position(s) out of ortho-, meta- and para-positions on the aromatic ring.

Specific examples of the compound represented by the general formula (6) include the following compounds:
2,2-bis(3,5-dichlorophenyl)propane,
Bis(2-chlorophenyl)methane,
1,2-bis(2,6-dichlorophenyl)ethane,
1,1-bis(4-iodophenyl)ethane,
1,1-bis(2-chloro-4-iodophenyl)ethane,
1,1-bis(2-chloro-4-methylphenyl)ethane,
1,1-bis(3,5-dichlorophenyl)ethane,
2,2-bis(3-phenyl-4-bromophenyl)ethane,
2,3-bis(4,6-dichloronaphthyl)propane,
2,2-bis(2,6-dichlorophenyl)pentane,
2,2-bis(3,5-dichlorophenyl)hexane,
Bis(4-chlorophenyl)phenylmethane,
Bis(3,5-dichlorophenyl)cyclohexylmethane,
Bis(3-nitro-4-bromophenyl)methane,
Bis(4-hydroxy-2,6-dichloro-3-methoxyphenyl)methane,
2,2-bis(3,5-dibromo-4-hydroxyphenyl)propane,
2,2-bis(3,5-dichloro-4-hydroxyphenyl)propane, and
2,2-bis(3-bromo-4-hydroxyphenyl)propane.

In addition, there can be used those bis-aromatic compounds which contain a sulfide group, a sulfoxy group, etc. in place of the two aliphatic groups contained in the above-described specific examples, for example, tetrabromobenzene, hexachlorobenzene, hexabromobenzene, 2,2'-dichlorobiphenyl, 2,4'-dibromobiphenyl, 2,4'-dichlorobiphenyl, hexabromobiphenyl, octabromobiphenyl, decabromobiphenyl, halogenated diphenyl ether containing 2 to 10 halogen atoms, oligomers composed of 2,2-bis(3,5-dibromo-4-hydroxyphenyl)propane and phosgene and having a degree of polymerization of 1 to 20, etc.

The halogen compound which is preferable as a flame retardant in the present invention includes aromatic halogenated compounds such as chlorinated benzene, brominated benzene, chlorinated biphenyl, chlorinated terphenyl, brominated biphenyl, and brominated terphenyl, compounds containing two phenyl nuclei separated by an intervening divalent alkylene group and also containing at least two chlorine or bromine atoms per one phenyl nucleus, and mixtures of two or more of the above-described compounds. Particularly preferred are hexabromobenzene, chlorinated biphenyl or terphenyl, and mixtures thereof with antimony oxide.

Representative phosphoric compounds which are suitably used as a flame retardant in the present invention include compounds represented by the general formula (7) and nitrogen-containing similar compounds.

wherein Q's, which may be the same or different, each represent a hydrocarbyl group such as an alkyl group, a cycloalkyl group, an aryl group, an alkyl-substituted aryl group and an aryl-substituted alkyl group; a halogen atom; a hydrogen atom; or a combination of these. Suitable examples of the phosphoric acid esters include phenyl bisdodecyl phosphate, phenyl bisneopentyl phosphate, phenyl ethylene hydrogen phosphate, phenyl bis(3,5,5'-trimethylhexyl) phosphate, ethyl diphenyl phosphate, 2-ethylhexyl di(p-tolyl) phosphate, diphenyl hydrogen phosphate, bis(2-ethylhexyl) p-tolyl phosphate, tritolyl phosphate, bis(2-ethylhexyl) phenyl phosphate, tri(nonylphenyl) phosphate, phenyl methyl hydrogen phosphate, di(dodecyl) p-tolyl phosphate, triphenyl phosphate, halogenated triphenyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, and diphenyl hydrogen phosphate. The most preferred phosphoric acid ester is triphenyl phosphate. It is also preferred to use triphenyl phosphate together with hexabromobenzene, or triphenyl phosphate together with antimony oxide.

Other flame retardant which can be used in the present invention includes compounds containing a phosphornitrogen bond such as phosphorus nitride chloride, phosphoric ester amide, phosphoric acid amide, phosphinic acid amide, tris(aziridinyl) phosphine oxide or tetrakis(hydroxymethyl) phosphonium chloride, etc.

There is no particular limitation on the methods of preparing the resin composition of the present invention, and ordinary known methods can be used for the purpose. For example, it is effective to mix the components in the form of solutions and then evaporate the solvent or precipitate the resin in a non-solvent. On an industrial scale, however, practical method for the production uses kneading the components in a melted state. For melt-kneading, there can be used a kneading apparatus such as a single-screw extruder or a twin-screw extruder generally used, or various types of kneaders. A twin-screw extruder of high shear type is particularly preferred.

Upon kneading, it is preferred to homogeneously mix the respective resin components in the form of powder or pellet in a tumbler, a Henschel mixer or a like apparatus. However, mixing may be omitted, if desired, and they are metered and fed separately to the kneading apparatus.

The kneaded resin composition can be molded by injection molding, extrusion molding or various other molding methods. The present invention, however, includes methods in which the resin components are dry blended upon injection molding or extrusion molding and directly kneaded during melt-processing operation to obtain molded articles.

In the present invention, there is no particular limitation on the order of kneading. For example, the component(s) (a), (b) and (c) may be kneaded in a lump, or components (a) and (b) may be kneaded previously followed by kneading the rubbery substance (c). Other kneading orders may also be used.

The thermoplastic resin composition of the present invention is superior in heat resistance, melt fluidity, processability, chemical resistance, impact resistance, appearance, and gloss. Owing to these characteristic properties, it can be molded into various articles such as sheets, tubes, films, fibers, laminated articles, coating materials by injection molding, extrusion molding, press molding, blow molding or a like method. In particular, it can be used as interior or exterior fitting materials for automobile parts such as bumper, instrument panel, fender, trim, door panel, wheel cap, side protector, side seal garnish, trunk lid, hood, quarter panel, air intake, lower apron, spoiler, front grille, radiator grille, mirror housing, air cleaner, core material of seat, glove box, console box, cooling fan, sirocco fan, brake oil tank, lamp housing, roof, etc.

It can also be used in machine parts which must be heat resistant. In addition, it can be used for bicycle parts such as covering material, muffler cover, leg shield, etc. Furthermore, the resin composition of the present invention can be used for electric and electronic parts which need to have high strength and heat resistance such as housing, chassis, connectors, printed substrates, pulleys, etc.

EXAMPLES

Hereinafter, the present invention will be explained in greater detail with reference to examples which should not be construed as limiting the present invention. Tests for heat deflection temperature under load or heat distortion temperature (H. D. T.) and Izod impact strength (thickness: 3.2 mm) was performed according to JIS K7207 and JIS K7110, respectively. The number mean particle size of the dispersion phase in the resin composition was measured using the electron microscope.

EXAMPLES 1 TO 7 AND COMPARATIVE EXAMPLES 1 TO 3

The resin compositions in these examples are composed of components(a), (b) and (c) which are explained below.

Component (a): Polyphenylene ether

Polyphenylene ether having a reduced viscosity of $\eta sp/C = 0.38$ or $\eta sp/C = 0.58$ produced by Nippon Polyether Co., Ltd. was used. The former is named "A-1", and the latter is named "A-2" for brevity hereinafter.

Component (b): Modified propylene polymer

This includes the following two species.

(i) In a 10-liter autoclave were charged pellets (1 kg) of block polypropylene AH561 (trade name for a product by SUMITOMO CHEMICAL CO., LTD; MI (230° C., 2.16 kg)=3.0) together with 4 liters of water, 275 g of styrene monomer, 5.8 g of dispersing agent (Metholose 90SH-100; trade name) and a peroxide (Perbutyl PV; trade name), and the mixture was allowed to react at 120° C. for about 1 hour while blowing nitrogen gas in. After cooling, the reaction mixture was extracted with methyl ethyl ketone to remove polystyrene and styrene-grafted crystalline propylene polymer was obtained. The amount of styrene which was grafted to the propylene polymer was 179 g and the degree of graft polymerization was 65%.

The degree of graft polymerization was obtained according to the following equation.

$$\text{Degree of graft polymerization (\%)} = \frac{W_1 - W_2}{W_3} \times 100$$

wherein $W_1$ indicates the weight of the grafted polymer, $W_2$ indicates the weight of the charged propylene polymer and $W_3$ indicates the weight of the charged styrene monomer.

This modified propylene polymer is called "B-1" for brevity.

(ii) In a 10-liter autoclave were charged pellets (800 g) of polypropylene H501 (trade name for a product by SUMITOMO CHEMICAL CO., LTD; MI=3.5) and pellets (200 g) of random polypropylene S131 (trade name for a product by SUMITOMO CHEMICAL CO., LTD; MI=1.2) together with 4 liters of water, 340 g of styrene monomer, 5.8 g of dispersing agent (Metholose 90SH-100; trade name) and a peroxide (Perbutyl PV; trade name), and the mixture was allowed to react at 120° C. for about 1 hour while blowing nitrogen gas in. After cooling, the reaction mixture was extracted with methyl ethyl ketone to remove polystyrene.

The amount of styrene which was grafted to the propylene polymer composition was 230 g and the degree of graft polymerization was 68%. This modified propylene polymer is called "B-2" for brevity.

Component (c): Styrene-grafted ethylene-propylene copolymer

In a stainless steel autoclave equipped with a stirrer were charged 100 parts by weight of ESPRENE E-201 (trade name for a product by SUMITOMO CHEMICAL CO., LTD.; EPM, $ML_{1+4}121°$ C.=27, ethylene content=47% by weight, Tg=−64° C.; hereinafter, this rubber is called "C-1" for brevity) as an ethylene-α-olefin copolymer rubber in the form of chips, 350 parts by weight of pure water, 4.0 parts by weight of calcium tertiary phosphate and 4.0 parts by weight of PLURONIC F-68 (trade name for a product by ASAHI DENKA CO., LTD.) and stirred with sufficient flow of nitrogen gas.

Thereafter, 37 parts by weight of styrene monomer and 0.75 part by weight of SUNPEROX TO (trade name for a product by SANKEN KAKOU CO., LTD.) as a free radical initiator were added to the resulting reaction mixture. After elevating the temperature to 110° C. in 80 minutes, the reaction was continued for 1 hour. After cooling, styrene-grafted copolymer was taken out by filtration and washed sufficiently with pure water followed by drying under vacuum. Infrared absorption spectrum analysis indicated that the styrene content of the styrene-grafted product was 28% by weight. Furthermore, the product had $ML_{1+4}121°$ C. of 55 and Tg of −55° C. Hereinafter, this rubber is called "C-2" for brevity.

The above-described polyphenylene ether, modified propylene polymer, rubbery substance, etc., were kneaded in proportion shown in Table 1 hereinbelow using LABO PLASTOMILL (produced by TOYO SEIKI CO., LTD.) for 10 minutes (examples 1-7) or 3 minutes (comparative examples 1-3) at a kneading temperature of 270° C. (examples 1-7) or 260° C. (comparature examples 1-3). The resulting composition was compression-molded to form test pieces, which were then measured for their physical properties.

The result of the tests for Izod impact strength, deflection temperature under load (HDT) and flexural modulus on each of the test pieces or samples are shown in Table 1 below.

From table 1, it can be seen that the composition in which number mean particles size of polyphenylene ether and rubbery substance in the dispersion phase is respectively less than 2μ shows remarkable improvement in the physical properties.

EXAMPLES 8 TO 10 AND COMPARATIVE EXAMPLES 4 TO 5

Component (a): Polyphenylene ether

Polyphenylene ether having a reduced viscosity of $\eta sp/C=0.45$ produced by NIPPON POLYETHER CO., LTD. was used. This polyphenylene ether is called "A-3" for brevity.

Component (b): Modified propylene polymer

This includes the following two species.

(i) As a starting block polypropylene was used SUMITOMO NOBLEN AV664B (trade name, produced by SUMITOMO CHEMICAL CO., LTD., MI=5.0).

1.8 parts by weight of maleic anhydride, 2.0 parts by weight of styrene, 1.0 part by weight of a free radical initiator composed of propylene homopolymer carrying thereon 6% by weight of 1,3-bis(t-butylperoxy-isopropyl)-benzen (trade name: SUNPEROX TY1.3, produced by SANKEN KAKOU CO., LTD.), and 0.1 part by weight of IRGANOX 1010 (trade name for a stabilizer produced by CIBA GEIGY AG), each per 100 parts by weight of polypropylene as the raw material, were mixed uniformly in a Henschel mixer, and melt kneaded at 220° C., for mean retention time of 1.5 minutes using a twin screw extruder TEX 44 SS-30BW-2V type produced by NIPPON SEIKO CO., LTD. to produce maleic anhydride.styrene-modified polypropylene having a maleic anhydride addition amount of 0.19% by weight and a melt flow rate of 23 g/10 minutes. Hereafter, this modified polypropylene is referred to as "B-3" for brevity.

(ii) In a 10-liter autoclave were charged pellets (1 kg) of SUMITOMO NOBLEN AZ774 (trade name for a product by SUMITOMO CHEMICAL CO., LTD., MI=30) together with 4 liters of water, 100 g of styrene monomer, 23 g of glycidyl methacrylate, 13 g of glycidyl acrylate, 6 g of a dispersing agent (METHOLOSE 90SH-100; trade name) and a peroxide (PERBUTYL PV; trade name), and the mixture was allowed to react at 120° C. for about 1 hour while blowing nitrogen gas in. After cooling, the grafted propylene polymer was recovered.

Hereinafter, the modified polypropylene is called "B-4" for brevity.

Component (c): Rubbery substance (i) Ethylene-propylene-diene rubber

In a stainless steel autoclave equipped with a stirrer were charged 100 parts by weight of ESPREN E-316 (trade name for a product by SUMITOMO CHEMICAL CO., LTD.; EPDM, $ML_{1+4}121°$ C.=27) as an ethylene-α-olefin copolymer rubber in the form of chips, 350 parts by weight of pure water, 4.0 parts by weight of calcium tertiary phosphate and 4.0 parts by weight of PLURONICK F-68 (trade name for a product by ASAHI DENKA CO., LTD.) and stirred with sufficient flow of nitrogen gas.

Thereafter, 9 parts by weight of glycidyl methacrylate and 0.75 part by weight of SUNPEROX (trade name for a product by SANKEN KAKOU CO., LTD.) as a free radical initiator were added to the resulting reaction mixture. After elevating the temperature to 110° C. in 80 minutes, the reaction was continued for 1 hour. After cooling, glycidyl methacrylate-grafted copolymer rubber was taken out by filtration and the filtrate was washed sufficiently with pure water followed by drying under vacuum.

Hereinafter, this modified ethylene-propylene-dien rubber is called "C-2" for brevity.

(ii) Epoxy group-containing copolymer

According to the method described in Unexamined Japanese Patent Publications Nos. 23490/1972 and 11888/1973, a terpolymer of ethylene-vinyl acetate-glycidyl methacrylate of 81:8:11 (% by weight) having a melt flow rate of 11.2 g/10 minutes (190° C., load: 2.16 kg) was produced by high pressure radical polymerization method. Hereafter, the epoxy group-containing copolymers are called "C-3" for brevity.

The above-described polyphenylene ether, modified propylene polymer, etc., were kneaded in proportions shown Table 2 hereinbelow at a kneading temperature of 270° C. for 10 minutes (examples 8–10 and comparative example 4) or at a kneading temperature of 260° C. for 4 minutes (comparative example 5).

The products were measured for their physical properties, and the results obtained are shown in Table 2, from which it is clear that the resin composition in which number mean particle size of polyphenylene ether and rubbery substance in the dispersion phase is respectively less than 2μ, shows high physical properties.

TABLE 1

| Example No. (Comparative Example No.) | Component (a) Polyphenylene Ether | | Component (c) Rubbery Substance | | | Component (b) Modified Propylene Polymer | Physical Properties | | |
|---|---|---|---|---|---|---|---|---|---|
| | | | | | | | Izod Impact Strength (Notched, kg · cm/cm) | | Heat Deflection Temperature under Load (4.6 kg/cm², °C.) |
| | Parts by Weight | Mean Particle Size (μ) | Species | Parts by Weight | Mean Particle Size (μ) | | −30° C. | 23° C. | |
| 1 | A-1 *1 38 | 1.5 | EPDM *2 | 22 | 1.8 | B-1 *3 53 | 9 | 19 | 131 |
| 2 | A-1 *1 38 | 1.0 | SBR *5 | 22 | 1.6 | B-1 *3 53 | 11 | 20 | 127 |
| 3 | A-1 *1 38 | 0.8 | SBS *6 | 22 | 0.2 | B-1 *3 53 | 14 | 26 | 125 |
| 4 | A-1 *1 38 | 1.8 | SBS *6 C-1 | 13 9 | 1.1 | B-1 *3 53 | 13 | 24 | 128 |
| 5 | A-1 *1 26 | 2.0 | SEP *7 C-1 | 11 13 | 1.8 | B-1 *3 50 | 12 | 21 | 116 |
| 6 | A-1 *1 | 1.7 | PB *8 | 9 | 1.7 | B-1 *3 | 10 | 14 | 121 |

TABLE 1-continued

| Example No. (Comparative Example No.) | Resin Composition | | | | | Component (b) Modified Propylene Polymer | Physical Properties | | Heat Deflection Temperature under Load (4.6 kg/cm², °C.) |
|---|---|---|---|---|---|---|---|---|---|
| | Component (a) Polyphenylene Ether | | Component (c) Rubbery Substance | | | | Izod Impact Strength (Notched, kg · cm/cm) | | |
| | Parts by Weight | Mean Particle Size (μ) | Species | Parts by Weight | Mean Particle Size (μ) | | −30° C. | 23° C. | |
| 7 | 26 A-1 *1 | 1.6 | SEBS *9 SBS *6 | 15 15 | 0.05 | 50 B-2 *4 50 | 16 | 31 | 109 |
| (1) | 29 A-1 *1 | 3.7 | SBR *5 | 22 | 5.1 | B-1 *3 53 | 3 | 5 | 105 |
| (2) | 38 A-1 *1 | 6.2 | EPDM *2 | 22 | 4.3 | B-1 *3 53 | 2 | 4 | 99 |
| (3) | 38 A-2 *10 26 | 2.4 | PB *8 SEBS *9 | 9 15 | 1.8 | B-1 *3 53 | 5 | 9 | 117 |

Note to Table 1
*1 Polyphenylene ether (NIPPON POLYETHER CO., LTD., ηsp/C = 0.30)
*2 Ethylene-propylene-diene rubber; SUMITOMO ESPREN E-305 (trade name, SUMITOMO CHEMICAL CO., LTD., ML$_{1+4}$ 100° C. = 79)
*3 Styrene-modified block propylene polymer
*4 Styrene-modified propylene polymer
*5 Styrene-butadiene rubber; SUMITOMO SBR1507 (trade name, SUMITOMO CHEMICAL CO., LTD., ML$_{1+4}$ 100° C. = 37)
*6 Styrene-butadiene block copolymer; CARIFLEX TR1116 (trade name, SHELL CHEMICAL CO., LTD.)
*7 Styrene-ethylene-propylene block copolymer; G1701X (trade name, SHELL CHEMICAL CO., LTD.)
*8 Polybutadiene; DIENE 35A (trade name, ASAHI CHEMICAL CO., LTD.)
*9 Styrene-ethylene-butadiene block copolymer; G1657 (trade name, SHELL CHEMICAL CO., LTD.)
*10 Polyphenylene ether (NIPPON POLYETHER CO., LTD., ηsp/C = 0.58)

TABLE 2

| Example No. (Comparative Example No.) | Resin Composition | | | | | Component (b) Modified Propylene Polymer | Physical Properties | | Heat Deflection Temperature under Load (4.6 kg/cm², °C.) |
|---|---|---|---|---|---|---|---|---|---|
| | Component (a) Polyphenylene Ether | | Component (c) Rubbery Substance | | | | Izod Impact Strength (Notched, kg · cm/cm) | | |
| | Parts by Weight | Mean Particle Size (μ) | Species | Parts by Weight | Mean Particle Size (μ) | | −30° C. | 23° C. | |
| 8 | A-3 *1 43 | 2.0 | C-2 | 17 | 0.9 | B-3 *2 57 | 11 | 20 | 122 |
| 9 | A-3 *1 43 | 1.7 | EPDM *3 SBR *4 | 7 10 | 1.8 | B-3 *2 57 | 9 | 17 | 129 |
| 10 | A-3 *1 28 | 1.6 | C-3 SBS *6 | 13 7 | 1.6 | B-4 *7 52 | 12 | 29 | 112 |
| (4) | A-3 *1 43 | 3.4 | SBR *4 | 17 | 3.1 | *5 57 | 4 | 9 | 95 |
| (5) | A-3 *1 28 | 4.0 | C-3 | 20 | 2.8 | B-4 *7 52 | 5 | 11 | 98 |

Note to Table 2
*1 Polyphenylene ether (NIPPON POLYETHER CO., LTD., ηsp/C = 0.45)
*2 Maleic anhydride-styrene-modified propylene polymer
*3 Ethylene-propylene-diene rubber; SUMITOMO ESPREN E512F (trade name, SUMITOMO CHEMICAL CO., LTD., ML$_{1+4}$ 121° C. = 66)
*4 Styrene-butadiene rubber; SUMITOMO SBR 1507 (trade name, SUMITOMO CHEMICAL CO., LTD., ML$_{1+4}$ 100° C. = 37)
*5 Block polypropylene; SUMITOMO NOBLEN AV664B (trade name, SUMITOMO CHEMICAL CO., LTD., MI = 5.0)
*6 Styrene-butadiene block copolymer; CARIFLEX TR1116 (trade name, SHELL CHEMICAL CO., LTD.)
*7 Styrene-glycidyl(metha)acrylate-modified propylene polymer

EFFECT OF THE INVENTION

As described hereinabove, the thermoplastic resin compositions of the present invention exhibit excellent effects in that they have not only good moldability but also they can give rise to molded articles whose physical properties are well balanced.

Novel resin compositions provided by the present invention can be processed with ease by conventional molding methods employed for ordinary polyphenylene ether based thermoplastic resins, for example, injection molding, extrusion molding, and provide products not only having well balanced physical properties such as impact strength, heat resistance and hardness but also having excellent homogeneity and smoothness in appearance.

In particular, it can be used as interior or exterior fitting materials for automobile parts such as bumper, instrument panel, fender, trim, door panel, wheel cap, side protector, side seal garnish, trunk lid, hood, quarter panel, air intake, lower apron, spoiler, front grille, radiator grill, mirror housing, air cleaner, core material of seat, glove box, console box, cooling fan, sirocco fan, brake oil tank, lamp housing, and roof.

It can also be used in machine parts which must be heat resistant. In addition, it can be used for bicycle parts such as covering material, muffler cover, leg shield, etc. Furthermore, the resin composition of the present invention can be used for electric and electronic parts which need to have high strength and heat resistance such as housing, chassis, connector, printed substrate, pulley, etc.

What is claimed is:

1. A thermoplastic resin composition, comprising:
  (a) a polyphenylene ether resin or a resin composition containing a polyphenylene ether,
  (b) (i) a modified propylene polymer obtained by grafting a propylene polymer with a styrene-based monomer or a mixture of a styrene-based monomer and a monomer copolymerizable with the styrene-based monomer or (ii) a composition containing said modified propylene polymer and a propylene polymer, and (c) a rubbery substance, wherein the component (b) is in a state of matrix phase, and the components (a) and (c) each is in a state of dispersion phase.

2. A thermoplastic resin composition as claimed in claim 1, wherein each number mean particle size of the components (a) and (c) in the dispersion phase is from 0.01 to 2 μm.

3. A thermoplastic resin composition as claimed in claim 1, wherein the proportion of the component (a) to the sum of the components (a) and (b) is 1 to 80% by weight, that of the component (b) to the sum of the components (a) and (b) is 99 to 20% by weight, and the proportion of the component (c) to the sum of the components (a) and (b) is 1 to 50 parts by weight per 100 parts by weight of (a) plus (b).

4. A thermoplastic resin composition as claimed in claim 1, wherein said propylene polymer in the component (b) is a highly crystalline polypropylene which is a homopolymer of propylene, or a block copolymer of propylene containing a boiling heptane-insoluble portion having an isotactic pentad fraction of at least 0.970.

5. A thermoplastic resin composition as claimed in claim 1, wherein said propylene polymer in the component (b) is a highly crystalline polypropylene which is a homopolymer of propylene, or a block copolymer of propylene containing a boiling heptane-insoluble portion having an isotactic pentad fraction of at least 0.970 and a content of a boiling heptane-soluble portion being not higher than 5.0% by weight and a content of a 20° C. xylene-soluble portion being not higher than 2.0% by weight.

6. A thermoplastic resin composition as claimed in claim 1, wherein said propylene polymer composition in the component (b) is a crystalline propylene polymer composition obtained by blending a propylene polymer with a polymer of a vinylcycloalkane having at least 6 carbon atoms, said composition containing 0.05 to 10,000 ppm by weight of a vinylcycloalkane unit.

7. A thermoplastic resin composition as claimed in claim 1, wherein said rubbery substance (c) is at least one rubber selected from the group consisting of ethylene-α-olefin copolymer rubber or modified products thereof ethylene-α-olefin-nonconjugated diene copolymer rubber or modified products thereof, butadiene styrene copolymer or hydrogenated products thereof, and epoxy group-containing copolymer.

8. A thermoplastic resin composition as claimed in claim 7, wherein said ethylene-α-olefin copolymer rubber is an ethylene-α-olefin copolymer rubber which has an ethylene content of 15 to 85% by weight, a Mooney viscosity ($ML_{1+4}121°$ C. of 5 to 120, and a glass transient point of not higher than $-10°$ C.

9. Molded articles which are made of the thermoplastic resin composition claimed in claim 1.

10. Automotive parts which are made of the thermoplastic resin composition claimed in claim 1.

11. Automotive parts as claimed in claim 10 which is selected from the group consisting of a bumper, instrument panel, fender, trim, door panel, wheel cap, side protector, side seal garnish, trunk lid, hood, quarter panel, air intake, lower apron, spoiler, front grille, radiator grille, mirror housing, air cleaner, core material of a seat, glove box, console box, cooling fan, sirocco fan, brake oil tank, lamp housing and roof.

* * * * *